United States Patent
Yuan et al.

(10) Patent No.: US 12,483,363 B2
(45) Date of Patent: Nov. 25, 2025

(54) GRANT FREE TRANSMISSION TECHNIQUES

(71) Applicant: ZTE Corporation, Guangdong (CN)

(72) Inventors: Zhifeng Yuan, Guangdong (CN); Yuzhou Hu, Guangdong (CN); Weimin Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 887 days.

(21) Appl. No.: 17/389,062

(22) Filed: Jul. 29, 2021

(65) Prior Publication Data

US 2021/0359803 A1 Nov. 18, 2021

Related U.S. Application Data

(63) Continuation of application No. PCT/CN2019/074652, filed on Feb. 2, 2019.

(51) Int. Cl.
*H04L 5/00* (2006.01)
*H04W 74/08* (2024.01)

(52) U.S. Cl.
CPC .......... *H04L 5/0044* (2013.01); *H04L 5/0051* (2013.01); *H04W 74/0866* (2013.01)

(58) Field of Classification Search
None
See application file for complete search history.

(56) References Cited

U.S. PATENT DOCUMENTS

| | | | | |
|---|---|---|---|---|
| 6,115,406 A * | 9/2000 | Mesecher | ............ | H04B 7/0613 370/335 |
| 10,009,152 B2 | 6/2018 | Maaref | | |
| 10,848,260 B2 | 11/2020 | Yoshimoto et al. | | |
| 10,912,060 B2 | 2/2021 | Lin et al. | | |
| 11,122,618 B2 | 9/2021 | Shimezawa et al. | | |
| 2011/0305291 A1* | 12/2011 | Marzetta | ............... | H04B 7/0452 375/267 |
| 2018/0199359 A1* | 7/2018 | Cao | ........................ | H04L 5/0012 |
| 2018/0199381 A1 | 7/2018 | Rong et al. | | |

(Continued)

FOREIGN PATENT DOCUMENTS

| | | |
|---|---|---|
| CN | 106507497 A | 3/2017 |
| CN | 107548094 A | 1/2018 |

(Continued)

OTHER PUBLICATIONS

Intel Corporation, "NOMA related procedure", Nov. 12-16, 2018, 3GPP TSG RAN WG1 Meeting #95 R1-1812477, pp. 1-5 (Year: 2018).*

(Continued)

*Primary Examiner* — Steve R Young
(74) *Attorney, Agent, or Firm* — Perkins Coie LLP

(57) ABSTRACT

Techniques are described for a grant-free transmission. A wireless method includes generating and transmitting the same message via one or more transmission channels. The message includes information indicative of one or more channel indexes associated with the one or more transmission channels, one or more pilot signals associated with the one or more transmission channels, one or more spreading sequences associated with the one or more transmission channels, one or more scrambling sequences associated with the one or more transmission channels, or an interleaving technique associated with the one or more transmission channels.

20 Claims, 12 Drawing Sheets

(56) References Cited

U.S. PATENT DOCUMENTS

| | | | | |
|---|---|---|---|---|
| 2018/0367238 | A1* | 12/2018 | Gong | H04J 99/00 |
| 2019/0089504 | A1* | 3/2019 | Hwang | H04L 27/26 |
| 2019/0098520 | A1* | 3/2019 | Kim | H04W 76/27 |
| 2019/0261318 | A1* | 8/2019 | Lin | H04L 1/1893 |
| 2021/0329533 | A1* | 10/2021 | Kim | H04W 48/12 |

FOREIGN PATENT DOCUMENTS

| | | | |
|---|---|---|---|
| CN | 108243457 | A | 7/2018 |
| CN | 108702246 | A | 10/2018 |
| TW | 201842796 | A | 12/2018 |
| WO | 2018032014 | A1 | 2/2018 |
| WO | 2018061572 | A1 | 4/2018 |
| WO | 2018072159 | A1 | 4/2018 |

OTHER PUBLICATIONS

Intel (Year: 2018).*
European Search Report for EP Patent Application No. 19849835.4, dated Feb. 24, 2022, 11 pages.
ZTE, "Text proposal to capture agreements made in RAN1#93 to TR 38.812 (NOMA)," 3GPP TSG RAN WG1 Meeting #94, R1-1808150, Gothenburg, Sweden, Aug. 20-24, 2018, 8 pages.
Chinese office action issued in CN Patent Application No. 201980091085.X, dated Jan. 28, 2023, 18 pages. English translation included.
Huawei et al., "Discussion on NoMA study for Rel-15 SI," 3GPP TSG RAN WG1 NR Ad-Hoc Meeting, R1-1711470, Qingdao, China, Jun. 27-30, 2017, 7 pages.
Institute for Information Industry (III), "On eMBB and URLLC Uplink Multiplexing," 3GPP TSG RAN WG1 Meeting#92, Athens, Greece, R1-1802245, 3 pages, Feb. 26-Mar. 2, 2018.
International Search Report and Written Opinion mailed on Aug. 29, 2019 for International Application No. PCT/CN2019/074652, filed on Feb. 2, 2019 (8 pages).
ZTE, "Considerations on Procedures related to NOMA," 3GPP TSG RAN WG1 Meeting #93, Busan, Korea, R1-1805842, 13 pages, May 21-25, 2018.
Korean notice of allowance issued in KR Patent Application No. 10-2021-7028087, dated Feb. 21, 2024, 8 pages. English translation included.
Chinese Notification to Complete Formalities of Registration issued in CN Patent Application No. 201980091085.X, dated Jun. 21, 2023, 4 pages. English translation included.
Korean office action issued in KR Patent Application No. 10-2021-7028087, dated Aug. 4, 2023, 7 pages. English translation included.
NTT Docomo, Inc., "NOMA related procedures," 3GPP TSG RAN WG1 Meeting #95, R1-1813307, Spokane, USA, Nov. 12-16, 2018, 6 pages.
Intel Corporation, "NOMA related procedure," 3GPP TSG RAN WG1 Meeting #95, R1-1812477, Spokane, USA, Nov. 12-16, 2018, 5 pages.
European Communication under Rule 71(3) EPC issued in EP Patent Application No. 19849835.4, dated Apr. 25, 2024, 45 pages.

* cited by examiner

GRANT FREE TRANSMISSION TECHNIQUES

CROSS-REFERENCE TO RELATED APPLICATIONS

This application is a continuation of and claims priority to International Patent Application No. PCT/CN2019/074652, filed on Feb. 2, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for grant-free or scheduling-free transmission. An exemplary wireless communication method comprises generating, by a device, a message to be transmitted via a plurality of transmission channels, where the message includes information indicative of a plurality of channel indexes associated with the plurality of transmission channels, and transmitting the message on each of the plurality of transmission channels associated with the device In some embodiments, the plurality of transmission channels is selected from a set of transmission channels according to the channel indexes. In some embodiments, the message includes information of a plurality of pilot signals associated with the plurality of transmission channels. In some embodiments, the plurality of pilot signals is selected from a set of pilot signals according to information of the plurality of pilot signals associated with the plurality of transmission channels. In some embodiments, the plurality of pilot signals are generated according to information of the plurality of pilot signals. In some embodiments, the plurality of pilot signals is generated by a sequence generator according to information of the plurality of pilot signals, where a seed or an initial state of sequence generator associated the plurality of pilot signals are determined by information of the plurality of pilot signals In some embodiments, the exemplary method further comprises adding a first pilot signal and a second pilot signal to a first set of data and a second set of data, respectively, where the first pilot signal and the second pilot signal are generated or selected from the plurality of pilot signals; and transmitting the first and second set of data using a first transmission channel and a second transmission channel, respectively. In some embodiments, plurality of pilot signals includes preambles or demodulation reference signals (DMRSs).

In some embodiments, the message includes information about a plurality of spreading sequences associated with the plurality of transmission channels. In some embodiments, the plurality of spreading sequences is selected from a plurality of spreading sequences based on information about the plurality of spreading sequences associated with the plurality of transmission channels. In some embodiments, the plurality of spreading sequences are generated by a seed generator with seed values or initial values determined by information about the plurality of spreading sequences associated with the plurality of transmission channels.

In some embodiments, the exemplary method further comprises spreading a first set of data and a second set of data using a first spreading sequence and a second spreading sequence, respectively, where the first spreading sequence and the second spreading sequence are generated or selected from the plurality of spreading sequences; and transmitting the first and the second set of data using a first transmission channel and a second transmission channel, respectively.

In some embodiments, the message includes information of a plurality of pilot signals that are associated with the plurality of transmission channels, where the message includes information of a plurality of spreading sequences that are associated with the plurality of transmission channels, and where an index of at least one pilot signal is mathematically related to an index of at least one spreading sequence.

In some embodiments, information bits of the message indicate indexes of the plurality of pilot signals. In some embodiments, information bits of the message indicate seed values of a plurality of pilot signals associated with the plurality of transmission channels. In some embodiments, information bits of the message indicate indexes of a plurality of spreading sequences in a spreading sequence set associated with the plurality of transmission channels. In some embodiments, information bits of the message indicate seed values or initial state values of a plurality of spreading sequences associated with the plurality of transmission channels. In some embodiments, the message includes an identifier of the device.

In some embodiments, the device is included in a vehicle, and the message further includes vehicle condition information, operational information about a driver of the vehicle, or information associated with one or more sensors of the vehicle. In some embodiments, a transmit power of the message is boosted a pre-determined value in response to the message including a pre-determined emergency signal. In some embodiments, the pre-determined emergency signal includes emergency braking the vehicle, emergency accelerating the vehicle, or emergency changing a road lane of the vehicle.

In some embodiments, the message is modulated by the device using binary phase shift keying (BPSK), $\pi/2$ BPSK, or quadrature phase shift keying (QPSK).

In some embodiments, the message is modulated by the device using differential binary phase shift keying (DBPSK), differential $\pi/2$ binary phase shift keying ($\pi/2$-DBPSK), or differential quadrature phase shift keying (DQPSK).

In some embodiments, the message is transmitted by using orthogonal frequency division multiplexing (OFDM) or discrete Fourier transform spread (DFT-S) OFDM waveform with a cyclic prefix (CP) longer than a sum of delay spread of at least one transmission channel and a residual timing synchronization error. In some embodiments, information on a plurality of scrambling sequences associated with the bit or symbols scrambling procedure on a plurality of transmission channels, or information on a plurality of interleaver associated with a bit or symbols interleaving procedure on the plurality of transmission channels.

In some embodiments, a device, such as a signal processing unit in a vehicle, can receive the message generated and transmitted by another device. The device decodes the received message based on the information included in the message and based on the techniques described in this patent document. For example, the device may perform a multi-user detection process as described in this patent document to decode the message sent by the transmitting device. The receiver may also perform demodulation (e.g., QPSK or BPSK demodulation) to obtain the information in the message. In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
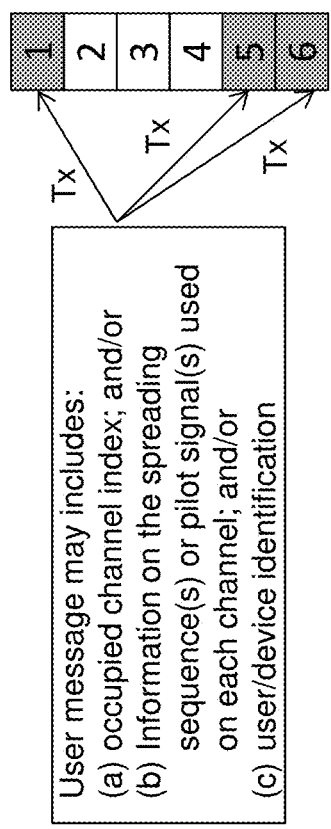
FIG. 1 shows an example of information included in a message generated by a user transmitted via a plurality of transmission channels.

A grant-free/scheduling-free/unscheduled transmission does not require the grant or control or coordination by the base station or other central nodes, thus can save signaling, power consumption, and reduce transmission delay, and is particularly suitable for massive Machine Type Communication (mMTC) or device-to-device (D2D) direct communication or vehicle-to-vehicle (V2V) direct communication system. However, in mMTC's grant-free transmission, or V2V's or D2D's direct grant-free transmission, as no grant or control or coordination by the base station or other central nodes, each user equipment (UE) or device or vehicle independently or autonomously decides or selects its transmit signature, such as the 1) pilot sequence or preamble sequence or DMRS transmitted with the data symbols, 2) the spreading code used to do the symbols spreading to generate the spread symbol carrying the data, 3) scrambling code used to do the bit or symbol scrambling to generate the transmit signal, or 4) interleaver used to do the bit or symbol interleaving to generate the transmit signal. In other words, the independently/autonomously selected signature is used in the generation of transmit signal. In such cases, a transmission signature of two or more transmitting UEs or devices or vehicles may collide. In other words, two or more transmitting UEs or devices or vehicles may select the same transmission signature. For example, a first signal transmitted by a first device may include a transmission signature such as a pilot signal that may collide with a second signal transmitted by a second device. In another example, two signals generated and transmitted by two devices both include a symbol spreading procedure, where the modulation symbols are spread by a spreading code, and the two devices use the same spreading code to spread its modulation symbols. Such collisions can lead to reduced reliability. In another example, two signals generated and transmitted by two devices both include a symbol scrambling procedure, where the modulation symbols are scrambled by a scrambling sequence, and the two devices use the same scrambling sequence to scramble its modulation symbols. Such collisions can lead to reduced reliability. In another example, two signals generated and transmitted by two devices both include a bit interleaving procedure, where the FEC coded bits are interleaved by a interleaver, and the two devices use the same interleaver to interleave its FEC coded bits. Such collisions can lead to reduced reliability. Moreover, the grant-free transmission or unscheduled transmission usually does not have a link adaptation and are susceptible to channel fading, which can also decrease the transmission reliability.

More specifically, symbol spreading means that the modulation symbols are spread by a spreading code. For example, each vehicle or UE spreads its digital modulation information symbols using an N-length spreading code or spreading sequence $\{c_k\}$. Let K denote the number of simultaneously active UEs or vehicles. If all these UEs or devices or vehicles deploy a single transmit(TX) antenna and the receiver deploy a single receive(RX) antenna, the digital received signal vector $y \in \mathbb{C}^N$, where N is the number of frequency domain resource elements (REs) spanned by the N-length spreading vector and carry the same digital modulation symbols, at the receiver can be written as $$y = \sum_{k=1}^{K} c_k \odot h_k s_k + w,$$

where $h_k$ is the channel vector between the transmit antenna of the k-th UE or vehicle and the receive antenna of the receiver, $s_k$ is the digital modulation symbol of the k-th UE or vehicle and the operator $\odot$ stands for the pointwise multiplication or product of two vectors. Note that the N-length spreading code or spreading sequence $\{c_k\}$ also acts as the transmit signature (signature vector).

In some embodiments, the transmit signal generator generates transmission signals without using symbol spreading techniques. In the context of symbol spreading, without symbol spreading can also be regarded as spreading symbols using the degenerate one-length spreading code $\{1\}$. With this degenerate one-length spreading code $\{c_k\} = \{1\}$, the digital received signal vector corresponding to the symbol without spreading can also be written as $$y=\Sigma_{k=1}^{K} c_k \odot h_k s_k + w,$$

If multiple RX antennas are deployed in the receiver, we can form the digital received signal corresponding to a single digital modulation symbol, simply by concatenating the N-length received vector y from each RX antenna. For example, if M RX antennas are deployed in the given vehicle, we can form the M*N digital received signal vector corresponding to a single digital modulation symbol, simply by concatenating the M N-length received vectors from each of the RX antennas.

As there may be many target signals superimposed in the received signal vector, the separation of the target information is not easy even by the means of advanced multi-user detection. In order to ensure the reliability of multi-user detection, each UE or vehicle can modulate its forward error correction (FEC) coded bits by a robust low order modulation scheme, such as binary phase shift keying (BPSK) or quadrature phase shift keying (QPSK), or π/2-BPSK for its further low Peak to Average Power Ratio (PAPR) merit. Such that the $s_k$ is the BPSK or QPSK, or π/2-BPSK modulation symbols.

In some embodiments, the transmit signal generator generates transmission signals without using symbol spreading techniques. In the context of symbol spreading, without symbol spreading can also be regarded as spreading symbols using the degenerate one-length spreading code {1}. With this degenerate one-length spreading code $\{c_k\}=\{1\}$, the digital received signal vector corresponding to the symbol without spreading can also be written as $$y=\Sigma_{k=1}^{K} c_k \odot h_k s_k + w,$$

In some embodiments each transmission can contain a certain pilot (e.g., preamble or demodulation reference signal (DMRS)) to simplify multi-user detection, that is, by detecting the pilot first, with the MUD receiver of a vehicle can know how many UEs' or vehicles' signal are received, and these UEs' or vehicles' channels can be further estimated by pilots, then conventional multi-user detection can be performed. But such a signal processing is done at the expense of (1) a reduction in spectral efficiency because the pilot symbols require a certain amount of overhead, and (2) the problem of collision with the pilots under the contention-based grant-free transmission. Once two UEs or vehicles select the same pilot (pilots collide), at least the information of one of the UEs or vehicles will not be translated, and sometimes the information of the two UEs or vehicles will not be translated, which reduces reliability.

In order to avoid the two problems of pilot collision and pilot overhead in contention-based grant-free transmission, the transmission can contain only data symbols, and the multi-user detection can be performed without the pilot, and this type of multi-user detection can be called data-only multi-user detection or blind multi-user detection. However, due to the lack of pilots, data-only multi-user detection requires the introduction of advanced blind detection techniques, such as blind activity detection and blind equalization. It also requires the data pilot technology, that is, once a user's information is decoded correctly, the reconstructed correct data symbols can play the role of pilots for channel estimation, which is needed for the reconstruction of the received signal of this user. To remove the effect of a user from the aggregate received signal in the successive interference cancellation (SIC)-based MUD receiver, its contribution must be reconstructed from the decoded information. In a channel with wireless multipath and/or Doppler effect, this contribution depends also on the channel.

In order to avoid the two problems of pilot collision and pilot overhead in contention-based grant-free transmission, the transmission can contain only data symbols. Further, in order to simplify the data-only multi-user detection, the digital modulation method used to generate the modulation symbol in a data-only transmission can be the differential modulation. If each UE or vehicle modulate its FEC coded bits using differential modulation technique, then the data-only multi-user detection can take advantage of non-coherent demodulation, which avoids the complexity and inaccuracy of channel equalization in multi-user detection. Note that, wireless channel and/or timing synchronization error and/or Doppler effect all could introduce distortions on the modulation symbols which makes the channel equalization more complicated. Thus, differential modulation and non-coherent demodulation can significantly easy the multi-user detection in a contention-based grant-free transmission. On the other hand, the differential modulation and non-coherent demodulation is more sensitive to the inter-user interference and additive white gaussian noise (AWGN), thus low order differential modulation, such as differential BPSK(DBPSK) or differential π/2-BPSK(π/2-DBPSK) or differential QPSK (DQPSK) can be used in contention-based grant-free transmission.

To improve the reliability of the contention-based grant-free transmission, in some embodiments, a same information can be transmitted through multiple transmission channels, and the following two principles can be followed. First, the transmission channels can be selected by each UE or vehicle independently or autonomously or randomly. Second, a UE's or vehicle's signatures (e.g., pilot signal, spreading sequence or spreading code) used in different channels can also be generated independently or autonomously or randomly or selected independently or autonomously or randomly from a signature set or a signature pool, such as a pilot signal set or pool or a spreading sequence set or pool. In this patent document, the term vehicle can include a car, a bicycle, an electric car, a scooter, a boat, an airplane, or a train.

These two principles are beneficial because they can significantly increase the randomness of transmission and reduce the possibility of full collision of two users' or devices' transmission. Full collision of two users' or devices' transmission can include the scenario where the occupied channel indexes and the signatures used to generate the transmit signal of these two users or devices are both identical. On the other hand, by independently or autonomously selecting the transmit channels and independently or autonomously selecting or generating the signature, even if two users have a signature collision in one of their transmit channels, their other transmit channels could be disjoint or their signatures used in other channels are different, thus these two users' information can be separated in their other transmit channels. Furthermore, even if one of the multiple occupied channels experiences deep fading, the user's transmission on other channels may not be faded, thus improving reliability.

FIG. 1 shows an example of information included in a message generated by a user transmitted via a plurality of transmission channels. As explained in this patent document, the term user may include device or vehicle. In FIG. 1, the same message is being transmitted via transmission channels 1, 5, and 6. The user message may include: 1) occupied channel index; and/or 2) information on the spreading sequence(s) or pilot signal(s) used on each channel, and/or 3) user or device identification. In other words, the message transmitted in all the occupied channels includes the 1) information about which transmission channels are used for transmitting the message, such as the indexes of the occupied transmission channel used for transmitting the message. The message may also include information on one or more pilot signals associated with the one or more transmission channels, and/or one or more spreading sequences associated with the one or more transmission channels. In an exemplary embodiment, as described in this patent document, the transmitted message may be spreaded using symbol spreading technology, and/or the transmitted message may include pilot signal. The generated message may also include the user or device identification, such that one the receiver successfully decodes the message, it can determine who sent this message and can perform appropriate response to this user or device. In summary, the message transmitted in all the occupied channels includes the information about the reconstruction of the received signals on all the occupied channel, which can significantly facilitate the SIC-based MUD receiver, and the information needed by a grant-free transmission (e.g., the user or device identification).

The two information, 1) occupied channel and occupied channel index; 2) information on the spreading sequence(s) or pilot signal(s) used on each channel, may be carried by some dedicated bits. For example, if there are 64 available preambles in a preamble set for the multi-channel transmission, 6 bits can be used to determine a preamble from the preamble set, then 18 dedicated bits can be included in the user message to determine 3 preambles used on the 3 channels respectively. Similarly, if there are 32 available spreading codes in a code set for the multi-channel transmission, 5 bits can be used to determine a spreading code from the code set, then 15 dedicated bits can be included in the user message to determine 3 spreading codes which are then used to perform symbol spreading on the 3 channels respectively. Obviously using dedicated bits to indicate these two information needs extra overhead which reduces the transmission efficiency. In contrast, the information bits of the payload can use to indicate the two information. For example, some 6 bits of the payload can be used to determine a preamble from the 64-size preamble set. some 5 bits of the payload can be used to determine a spreading code from the 32-size code set. In the case preamble and symbol spreading are both used for the transmission, some 6 bits [b1,b2,b3,b4,b5,b6] of the payload can be used to determine a preambles from the 64-size preamble set, and further 5 bits of [b1,b2,b3,b4,b5,b6] can be used to determine a spreading code from the 32-size code set. Such that, after detecting the preamble on a transmission channel, the spreading code used on the same channel can also be determined. This is a mapping relationship between the preamble and spreading code used in each of the occupied channels. In the case that the user or device identification is a necessary information for a grant-free transmission message, some 6 bits of the user or device identification can be used to determine a preambles from the 64-size preamble set, or some 5 bits of the user or device identification can be used to determine a spreading code from the 32-size code set, or some 6 bits of the user or device identification can be used to determine a preambles from the 64-size preamble set and a spreading code from the code set, which size is smaller than 64, such as 32,16.

Figure 2:
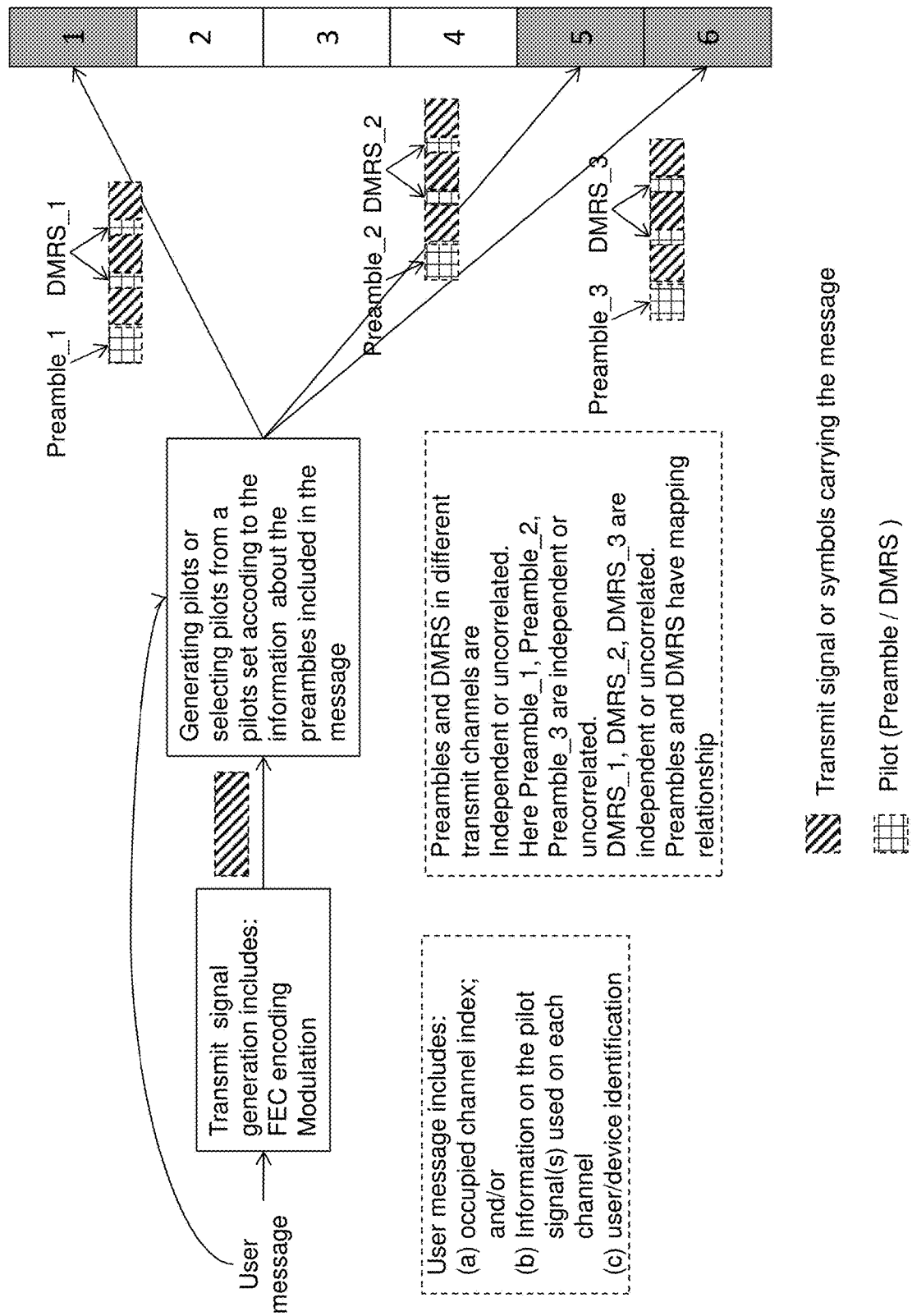
FIG. 2 shows an example of a message generated by a user transmitted via a plurality of transmission channels.

FIG. 2 shows an example of a message generated by a user transmitted via a plurality of transmission channels. As explained in this patent document, the term user may include device or vehicle. In FIG. 2, the same message is being transmitted via transmission channels 1, 5, and 6. The user message may include: 1) occupied channel index; and/or 2) information on the three pilot signals used on each of the three channel, 3) user or device identification. The transmit signals on the three channels carrying the same user message but appending independent or uncorrelated pilot signals, e.g., Preamble_1, DMRS_1 are appended in the transmit signal on first occupied channels(channel 1), Preamble_2, DMRS_2 are appended in the transmit signal on second occupied channels(channel 5), and Preamble_3, DMRS_3 are appended in the transmit signal on third occupied channels(channel 6). Preambles and DMRS in different transmit channels are independent or uncorrelated. Preambles and DMRS have mapping relation.

Figure 3:
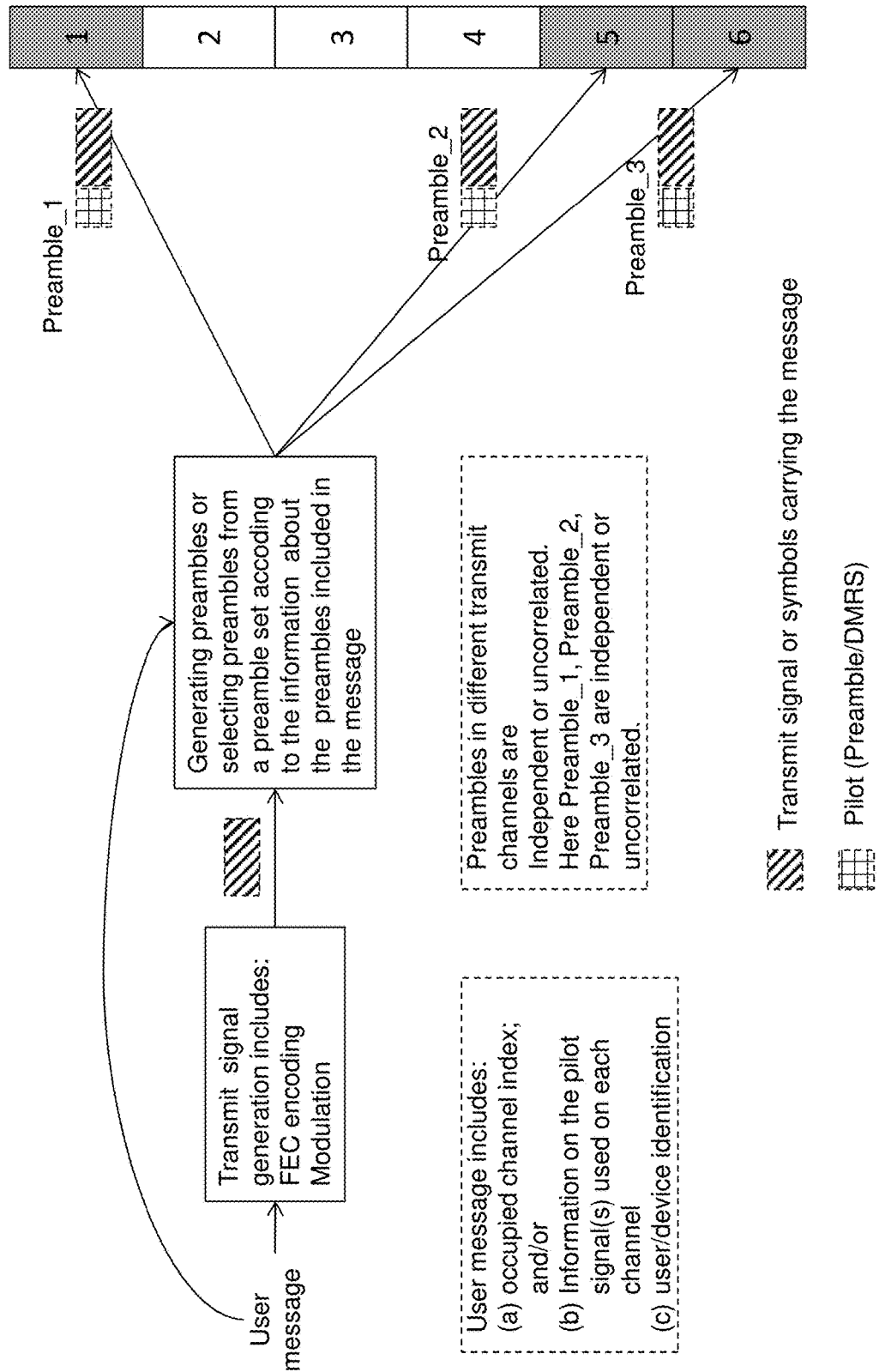
FIG. 3 shows another example of a message generated by a user transmitted via a plurality of transmission channels.

FIG. 3 shows an example of a message generated by a user transmitted via a plurality of transmission channels similar to FIG. 2, except for that in FIG. 3 there are no DMRSs in the transmit signals. The user message may include: 1) occupied channel index; and/or 2) information on the three preamble signals used on each of the three channel, 3) user/device identification.

Figure 4:
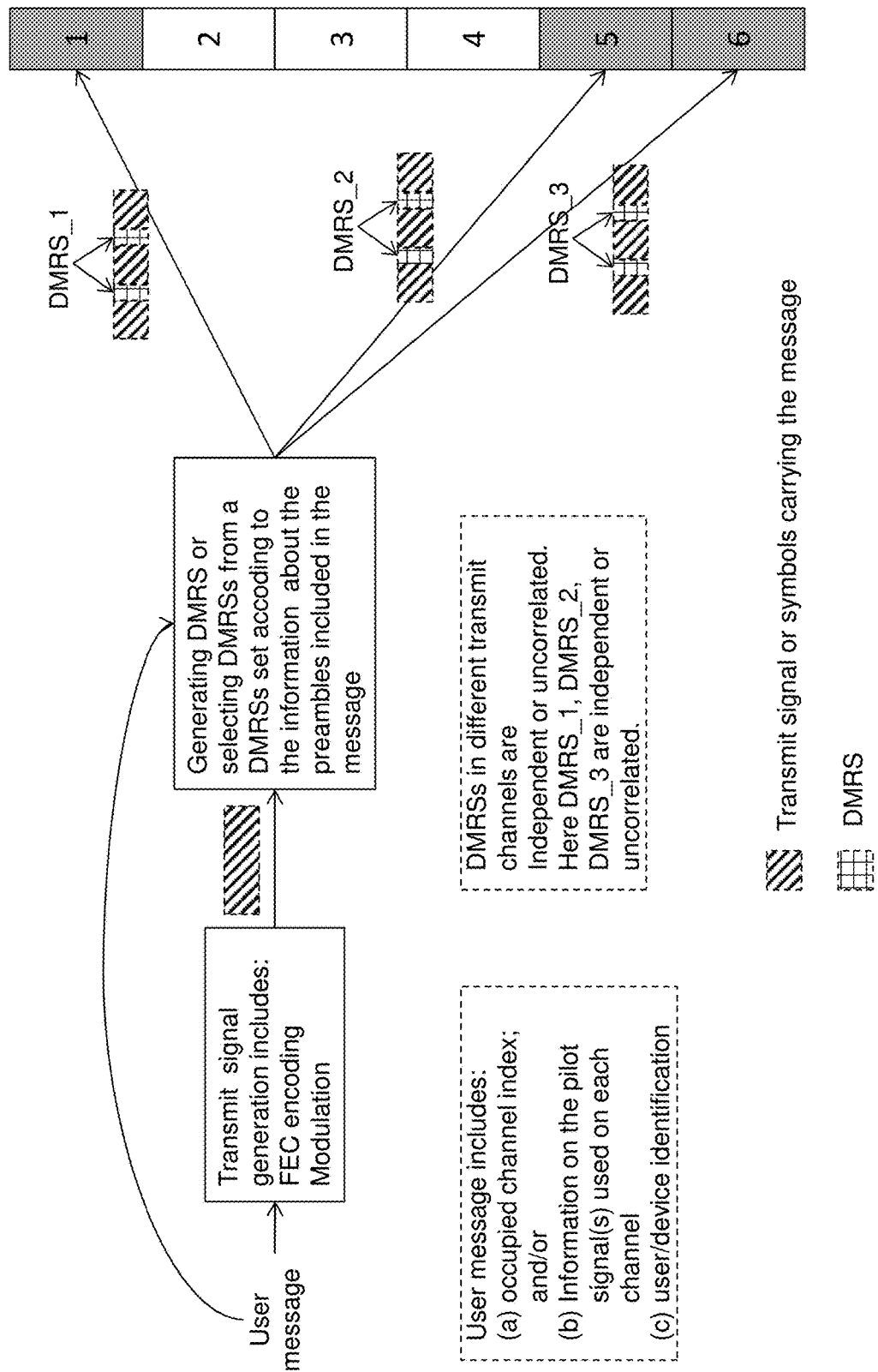
FIG. 4 shows yet another example of a message generated by a user transmitted via a plurality of transmission channels.

FIG. 4 shows an example of a message generated by a user transmitted via a plurality of transmission channels similar to FIG. 2, except for that in FIG. 4 there are no preambles in the transmit signals. The user message may include: 1) occupied channel index; and/or 2) information on the three DMRS signals used on each of the three channel, 3) user or device identification.

Figure 5A:
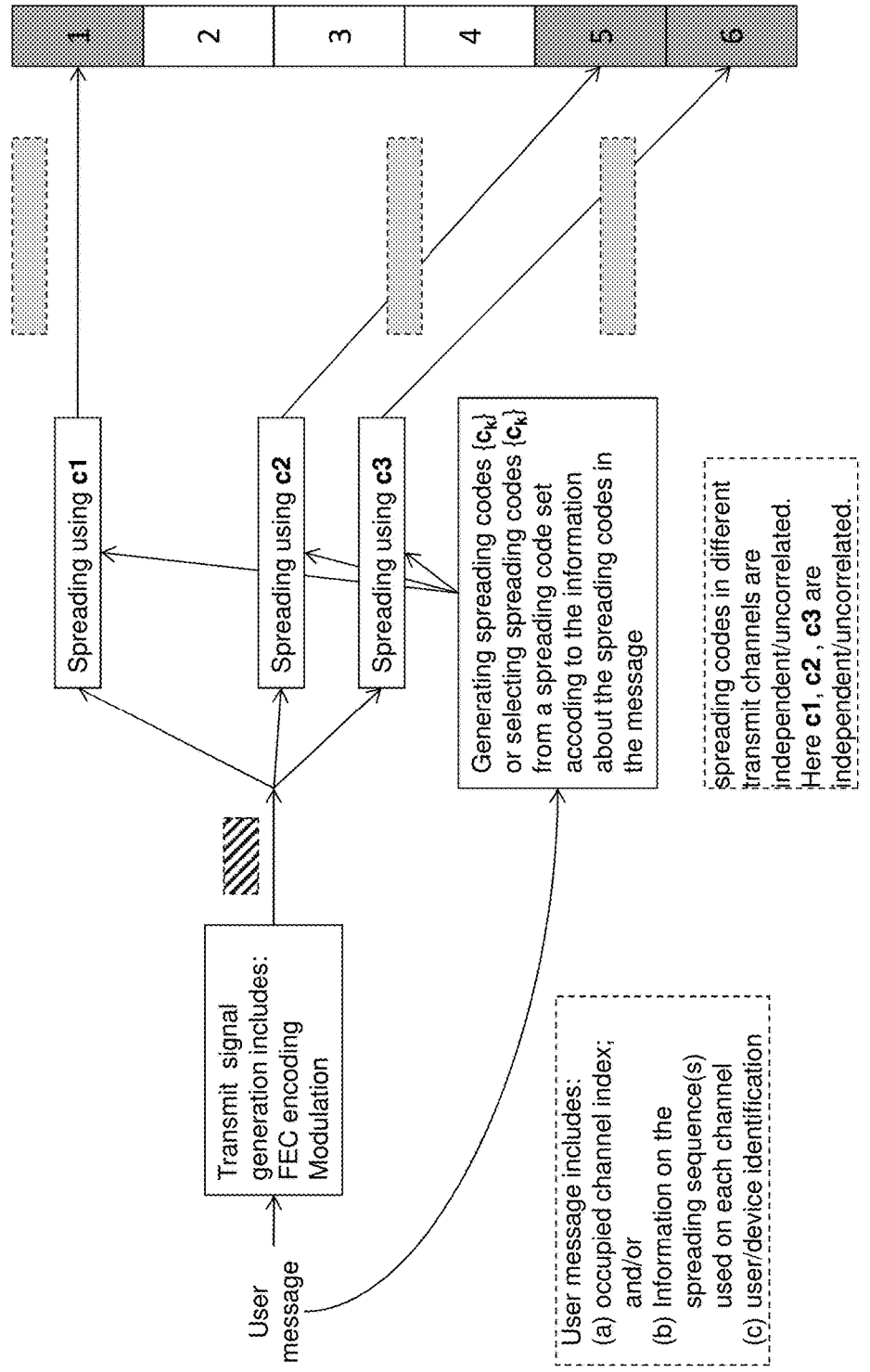
FIGS. 5A and 5B show some more examples of a message generated by a user transmitted via a plurality of transmission channels.
Figure 5B:
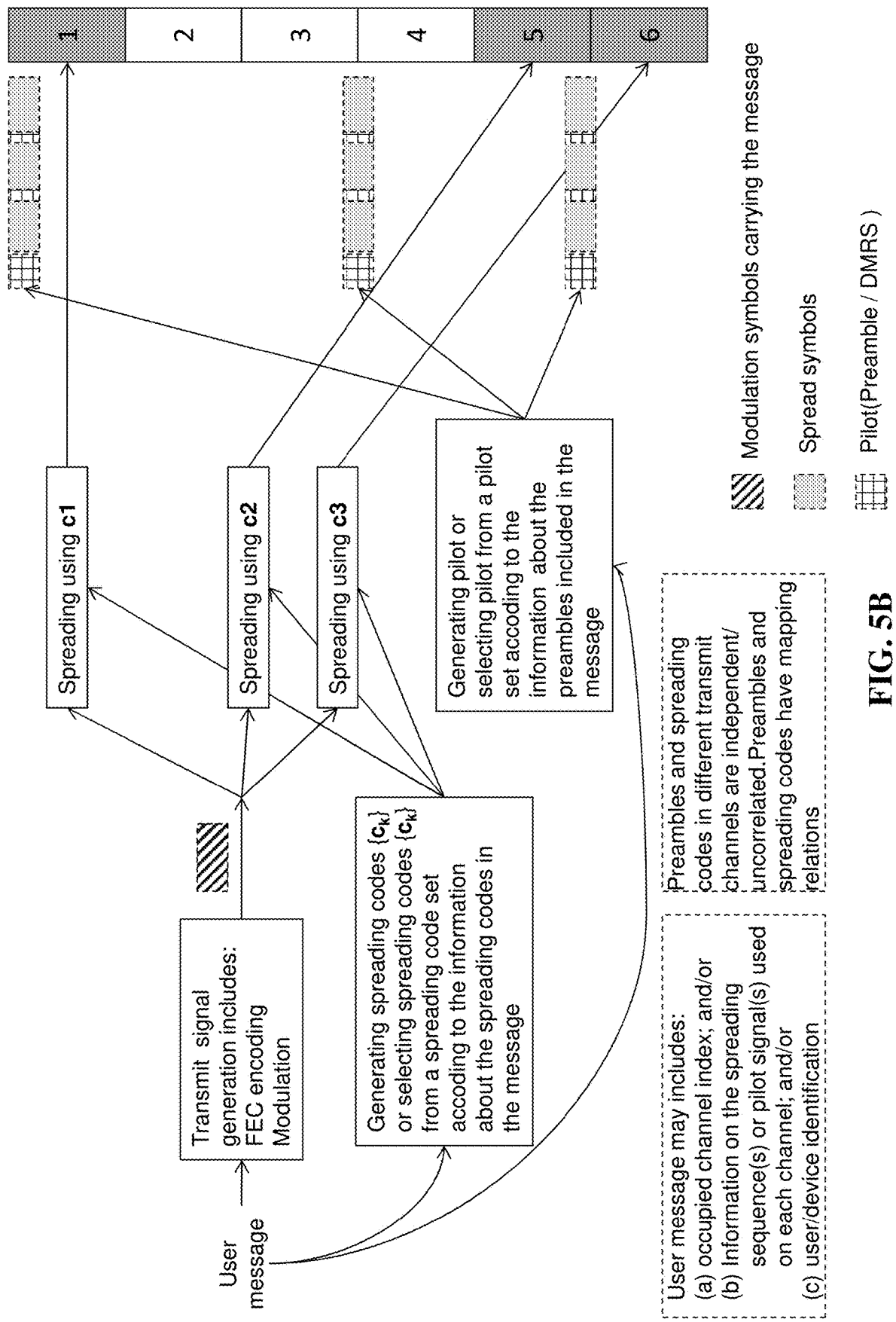

FIGS. 5A and 5B show examples of a message generated by a user transmitted via a plurality of transmission channels. As explained in this patent document, the term user may include device or vehicle. In FIGS. 5A and 5B, the same message is being transmitted via transmission channels 1, 5, and 6. The user message may include: 1) occupied channel index; and/or 2) information on the spreading sequences used on each channel, 3) user or device identification. The transmit signals on the three channels all employ the symbol spreading technology, e.g. the modulation symbols are spread by a spreading code. The spread signals transmitted on the three channels carry the same user message but are spread by their independent or uncorrelated spreading code, e.g., c1 is used to spread the modulation symbols on the first channel, c2 is used to spread the modulation symbols on the second channel, and c3 is used to spread the modulation symbols on the third channel. Spreading codes in different transmit channels are independent or uncorrelated. Here c1, c2, c3 are independent or uncorrelated. FIG. 5A is similar to FIG. 5B, except for that in FIG. 5A there are no pilot signals in the transmit signals.

Figure 6:
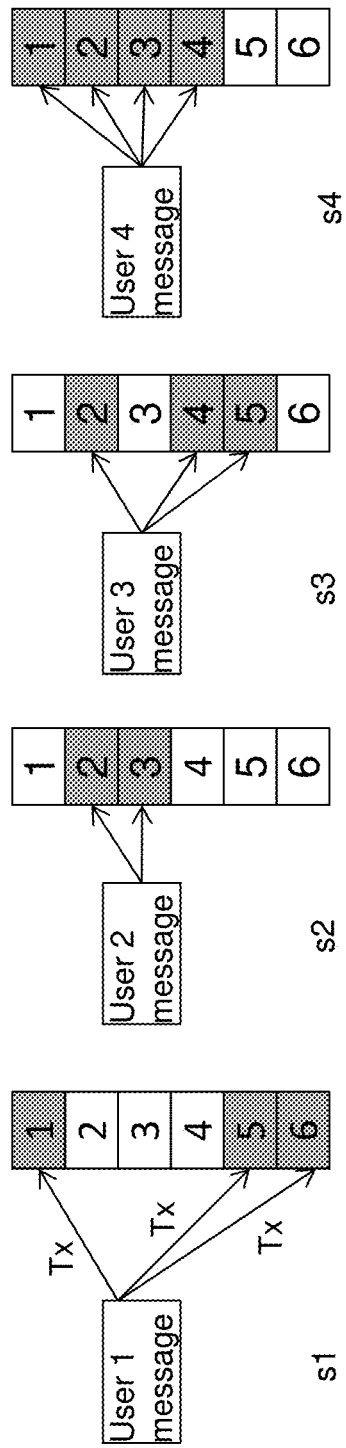
FIG. 6 shows an example of a multi-channel grant free transmission.

FIG. 6 shows an example of a multi-channel grant free transmission where at least one user transmits on a transmission channel not used by other users. To increase the reliability of grant-free transmission, the example system as shown in FIG. 6 sets up six available channels, and each user independently or autonomously selects one or more channels from the six channels and then transmits it's message or information on these independently or autonomously selected channels To increase the transmission randomness and reduce the signature collision between grant-free transmission users or devices, the following two exemplary techniques can be used.

First, each device can randomly select which channel to use for transmission of a generated message. The channel selection may involve determining a number of channels to use and their respective indexes. For example, user 1 selects three channels to transmit independently or autonomously with channel indexes [1 5 6], user 2 selects two channels to transmit independently or autonomously with channel indexes [2 3], user 3 selects three channels to transmit independently or autonomously with channel indexes [2 4 5], and user 4 selects four channels to transmit independently or autonomously with channel indexes [1 2 3 4].

Second, a device may generate a transmit signal carrying the message by randomly selecting a transmission signature such as a pilot signal or a spreading sequence for each of the one or more transmission channels used to transmit the message. In embodiments where spreading sequence technology is used, a device can generate the transmit signal for each channel by randomly or independently or autonomously choosing a spreading sequence from a spreading sequence set or pool to spread the modulation symbols carrying the message generated by the device. Such that, the spreading sequences used in different channel are independent or uncorrelated. In embodiments where a pilot signal is used, a device may randomly or independently or autonomously choose the pilot signal from a pilot signal set or pool for each transmit channel (e.g., based on channel index(es)) such that, the pilot signal used in different channel are independent or uncorrelated.

In the example multi-channel grant-free transmission shown in FIG. 6, another user (e.g., user 5) includes one or more receivers that can receive wireless signals on the six channels shown in FIG. 6. The signal received by user 5 on the six channels (Ch) can be characterized as follows:

Ch1 receives $s_1*H_{11}+s_4*H_{41}$
Ch2 receives $s_2*H_{22}+s_3*H_{32}+s_4*H_{42}$
Ch3 receives $s_2*H_{23}\pm s_4*h_{43}$
Ch4 receives $s_3*H_{34}+S_4*H_{44}$.
Ch5 receives $s_1*H_{15}+s_3*H_{35}$
Ch6 receives $s_1*H_{16}$ where $H_{ij}$ represents the channel gain factor from user_i to channel_j, and $s_i$ represents the transmit symbols carrying the message or information of the user_i.

The multi-user detection process is as follows:

Step 1: Exhaustively detecting signal on each channel, and s1 was detected on Ch 6 since on Ch6 there is just one user's transmission which makes the detection easy. When s1 is decoded correctly, since s1 contains information about which channels are used by user 1, the receiver can determine that user 1 is still transmitting signals at Ch1, Ch5. And because s1 also contains information such as the spreading sequences or pilots used by user 1 on all transmit channels, the receiver can easily reconstruct the s1*H11 in the Ch1, as well as the s1*H15 in the Ch5, and then eliminate them. At this point, the reconstructed signal includes s1*H11, s1*H15, and s1*H16

After s1 is removed from the received signal of the corresponding channel, it remaining signal becomes the following:

Ch1 contains s4*H41
Ch2 contains s2*H22+s3*H32+s4*H42
Ch3 contains s2*H23±s4*H43
Ch4 contains s3*H34±s4*H44
Ch5 contains s3*H35.
Ch6 contains NULL Step 2: Exhaustively detect signal on each channel. Symbol s4 was detected on Ch1 and s3 was detected in Ch5 since on these two channel there is just one user's transmission, which makes the detection easy. Then s4 can be decoded correctly, but s3 is not translated since s3 experiences deep fading on Ch5. Since s4 contains information about which channels are used by user 4, the receiver can know that user 4 is still transmitting signals at Ch2, Ch3, and Ch4. And because the s4 also contains information such as the spreading sequences or pilots used by user 4 on all transmit channels, the receiver can easily reconstruct the s4*H42, s4*H43, s4H44 in Ch2, Ch3, Ch4 respectively, and then eliminate them. At this point, the reconstructed signal includes s4*H41, s4*H42, s4*H43, and s4*H44.

After the s4 is removed from the received signal of the corresponding channel, the remaining signals become the following:

Ch1 contains NULL
Ch2 contains s2*H22+s3*H32
Ch3 contains s2*H23
Ch4 contains s3*H34.
Ch5 contains s3*H35
Ch6 contains NULL Step 3: Exhaustively detect signal on each channel, and s2 is detected on Ch3 and s3 is detected in Ch4. When both s2 and s3 are decoded correctly, the receiver can eliminate s2, s3 from the corresponding channels.

After eliminating s2, s3 from the corresponding channels, the remaining signals become the following:

Ch1 contains NULL
Ch2 contains NULL
Ch3 contains NULL
Ch4 contains NULL
Ch5 contains NULL
Ch6 contains NULL Step 4: Exhaustively detect signal on each channel. At this point, nothing is detected from all the 6 channels, the detection is terminated.

Figure 7:
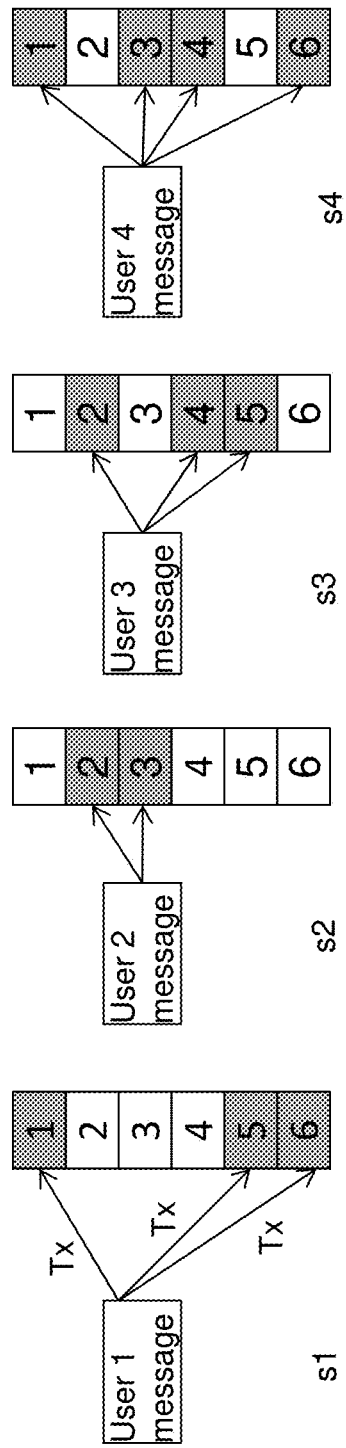
FIG. 7 shows another example of a multi-channel grant free transmission.

FIG. 7 shows an example of a multi-channel grant free transmission where at least two users transmits on at least one transmission channel. To increase the reliability of grant-free transmission, the example system as shown in FIG. 7 sets up six available channels, and each user independently or autonomously selects one or more channels from the six channels and then transmits it's message or information on these independently or autonomously selected channels To increase the transmission randomness and reduce the signature collision between grant-free transmission users or devices, the following two exemplary techniques can be used.

First, each device can randomly select which channel to use for transmission of a generated message. The channel selection may involve determining a number of channels to use and their respective indexes. For example, user 1 selects three channels to transmit independently or autonomously with channel indexes [1 5 6], user 2 selects two channels to transmit independently or autonomously with channel indexes [2 3], user 3 selects three channels to transmit independently or autonomously with channel indexes [2 4 5], and user 4 selects four channels to transmit independently with channel indexes [1 3 4 6].

Second, a device may generate a transmit signal carrying the message by randomly selecting a transmission signature such as a pilot signal or a spreading sequence for each of the one or more transmission channels used to transmit the message. In embodiments where spreading sequence technology is used, a device can generate the transmit signal for each channel by randomly or independently or autonomously choosing a spreading sequence from a spreading sequence set or pool to spread the modulation symbols carrying the message generated by the device. Such that, the spreading sequences used in different channel are independent or uncorrelated. In embodiments where a pilot signal is used, a device may randomly or independently or autonomously choose the pilot signal from a pilot signal set or pool for each transmit channel such that, the pilot signal used in different channel are independent or uncorrelated.

In the example multi-channel grant-free transmission shown in FIG. 7, another user (e.g., user 5) includes one or more receivers that can receive wireless signals on the six channels shown in FIG. 1. The information received by user 5 on the six channels can be characterized as follows:

Ch1 receives s1*H11+s4*H41
Ch2 receives s2*h22+s3*H32
Ch3 receives s2*H23+s4*H43
Ch4 receives s3*H34+s4*H44
Ch5 receives s1*H15+s3*H35
Ch6 receives s1*H16+s4*H46 where $H_{ij}$ represents a transmission channel user_i to channel_j, and $s_i$ represents the message or information transmitted by the user_i.

The multi-user detection process is as follows:

Step 1: Exhaustively detect signal on each channel. Through the detection of the pilot signal, the pilot signals of two strong users was detected in Ch 6. In this example, the pilot signal used by two users on the Ch6 are different, then the channel estimations of H16, H46 are then carried out by the two detected pilot signals. After the active user detection and channel estimation with the detected pilot signal, a multi user detection receiver can detect the information of these two detected users.

If the user's data uses the symbol spreading technology, and the spreading sequence and the pilot signal are selected by the transmitting device according to a mapping relationship known to the receiving device. After detecting the two pilot signals, the spreading sequence used by the two users can be determined by the receiver device. The pilot signals used by the two users are different, and the spreading sequences they use are also different.

Finally, the user 1 information s1 and the user 4 information s4 are solved in the Ch6 receiving signal s1*h16+s4*h46 by a multi user detection receiver. Since s1 contains information on which channels the user 1 uses, the receiver can know that the user 1 is still transmitting signals at Ch1, Ch5. And because s1 also contains information about the spreading sequences and pilots used by user 1 on all transmit channels, the receiver can easily reconstruct the s1*H11 in the Ch1, as well as the s1*H15 in the Ch5, and then eliminate them.

Further, since s4 contains information on which channels the user 4 uses, the receiver can determine that the user 4 also transmits signals at Ch1, Ch3, and Ch4. And because s4 also contains information about the spreading sequences and pilots used by user 4 on all transmit channels, the receiver can easily reconstruct the s4*H41,s4*H43, s4*H44 in the Ch1, Ch3 and Ch4 respectively, and then eliminate them.

After s1 and s4 are eliminated from the received signal of the corresponding channel, the remaining signals become the following:

Ch1 contains NULL
Ch2 contains s2*H22+s3*H32
Ch3 contains s2*H23
Ch4 contains s3*H34.
Ch5 contains s3*H35
Ch6 contains NULL Step 2: Exhaustively detect signal on each channel. s2 is detected on Ch3 and s3 is detected in Ch5. When s2 is decoded correctly, s3 is also decoded correctly. Similarly, the receiver can easily reconstruct the signals of S2 and S3 on all channel. At this point, the reconstructed signal includes: s2*H22, s3*H32, s2*H23, s3*H34, s3*H35. After s2 and s3 are erased in the received signal of the corresponding channel, the remaining signals become the following:

Ch 1 contains NULL
Ch 2 contains NULL
Ch 3 contains NULL
Ch 4 contains NULL
Ch 5 contains NULL
Ch 6 contains NULL Step 3: Exhaustively detect signal on each channel. At this point, the detecting can be terminate.

Communication may often require some level of synchronization, such as frequency synchronization, frame synchronization, symbol synchronization etc., to ensure the performance and ease the demodulation. The grant-free or scheduling-free or unscheduled transmission with the base station(BS) seeks the advantage of no close-loop handshaking with the BS, as a result only open-loop synchronization with the BS can be perform before the grant-free transmission. On the other hand, the inter-vehicle direct communication seeks the advantage of bypassing the base station, which introduces a difficulty of inter-vehicle synchronization. A common synchronization source can be used to ease the inter-vehicle synchronization. That is each vehicle can synchronize to the common synchronization source before its transmission.

Multi-path wireless channel and residual timing synchronization error can make the detection or equalization of grant-free transmission difficult. In order to ease the detection or equalization, orthogonal frequency division multiplexing (OFDM) or discrete Fourier transform spread (DFT-S) OFDM with a long enough cyclic prefix (CP) can be used to generate the transmit waveform of all the vehicles. A long enough CP means that the CP is longer than the sum of delay spread of the multi-path transmission channel and any residual timing synchronization error.

Figure 8:
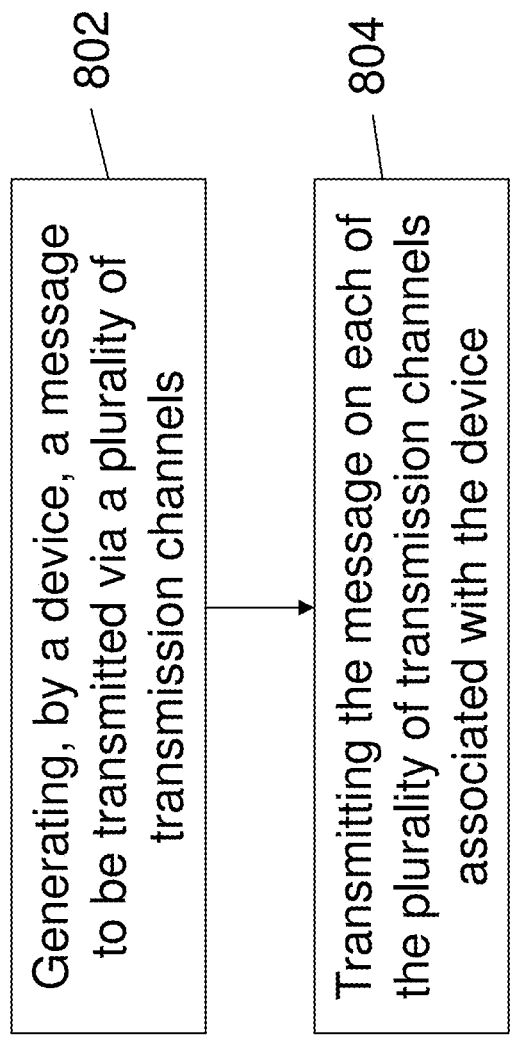
FIG. 8 shows an exemplary flowchart for transmitting a message for signal reconstruction via one or more transmission channels.

FIG. 8 shows an exemplary flowchart for transmitting a message for signal reconstruction via one or more transmission channels.

At the generating operation 802, a device generates a message to be transmitted via a plurality of transmission channels, where the message includes information indicative of a plurality of channel indexes associated with the plurality of transmission channels. At the transmitting operation 804, the device transmits the message on each of the plurality of transmission channels associated with the device.

In some embodiments, the plurality of transmission channels is selected from a set of transmission channels according to or corresponding to the channel indexes. In some embodiments, the message includes information of a plurality of pilot signals associated with the plurality of transmission channels. In some embodiments, the plurality of pilot signals is selected from a set of pilot signals according to or corresponding to information of the plurality of pilot signals associated with the plurality of transmission channels. In some embodiments, the plurality of pilot signals is generated according to or corresponding to information of the plurality of pilot signals. In some embodiments, the plurality of pilot signals is generated by a sequence generator according to information of the plurality of pilot signals, where a seed or an initial state of sequence generator associated the plurality of pilot signals are determined by information of the plurality of pilot signals.

In some embodiments, the exemplary method further comprises adding a first pilot signal and a second pilot signal to a first set of data and a second set of data, respectively, where the first pilot signal and the second pilot signal are generated or selected from the plurality of pilot signals; and transmitting the first and second set of data using a first transmission channel and a second transmission channel, respectively. In some embodiments, plurality of pilot signals includes preambles or demodulation reference signals (DMRSs).

In some embodiments, the message includes information about a plurality of spreading sequences associated with the plurality of transmission channels. In some embodiments, the plurality of spreading sequences is selected from a plurality of spreading sequences based on information about the plurality of spreading sequences associated with the plurality of transmission channels. In some embodiments, the plurality of spreading sequences are generated by a seed generator with seed values or initial values determined by information about the plurality of spreading sequences associated with the plurality of transmission channels.

In some embodiments, the exemplary method further comprises spreading a first set of data and a second set of data using a first spreading sequence and a second spreading sequence, respectively, where the first spreading sequence and the second spreading sequence are generated or selected from the plurality of spreading sequences; and transmitting the first and the second set of data using a first transmission channel and a second transmission channel, respectively.

In some embodiments, the message includes information of a plurality of pilot signals that are associated with the plurality of transmission channels, where the message includes information of a plurality of spreading sequences that are associated with the plurality of transmission channels, and where an index of at least one pilot signal is mathematically related to an index of at least one spreading sequence.

In some embodiments, information bits of the message indicate indexes of the plurality of pilot signals. In some embodiments, information bits of the message indicate seed values of a plurality of pilot signals associated with the plurality of transmission channels. In some embodiments, information bits of the message indicate indexes of a plurality of spreading sequences in a spreading sequence set associated with the plurality of transmission channels. In some embodiments, information bits of the message indicate seed values or initial state values of a plurality of spreading sequences associated with the plurality of transmission channels. In some embodiments, the message includes an identifier of the device.

In some embodiments, the device is included in a vehicle, and the message further includes vehicle condition information, operational information about a driver of the vehicle, or information associated with one or more sensors of the vehicle. In some embodiments, a transmit power of the message is boosted by or up to a pre-determined value in response to the message including a pre-determined emergency signal. In some embodiments, the pre-determined emergency signal includes emergency braking the vehicle, emergency accelerating the vehicle, or emergency changing a road lane of the vehicle.

In some embodiments, the message is modulated by the device using binary phase shift keying (BPSK), π/2 BPSK, or quadrature phase shift keying (QPSK).

In some embodiments, the message is modulated by the device using differential binary phase shift keying (DBPSK), differential π/2 binary phase shift keying (π/2-DBPSK), or differential quadrature phase shift keying (DQPSK).

In some embodiments, the message is transmitted by using orthogonal frequency division multiplexing (OFDM) or discrete Fourier transform spread (DFT-S) OFDM waveform with a cyclic prefix (CP) longer than a sum of delay spread of at least one transmission channel and a residual timing synchronization error. In some embodiments, information on a plurality of scrambling sequences associated with a bit or symbols scrambling procedure on the plurality of transmission channels, or information on a plurality of interleaver associated with a bit or symbols interleaving procedure on the plurality of transmission channels.

In some embodiments, a device, such as a signal processing unit in a vehicle, can receive the message generated and transmitted by another device, as described in FIG. 8 and in this patent document. The device decodes the received message based on the information included in the message and based on the techniques described in this patent document. For example, the device may perform a multi-user detection process as described in this patent document to decode the message sent by the transmitting device. The receiver may also perform demodulation (e.g., QPSK or BPSK demodulation) to obtain the information in the message.

Furthermore, in order to improve the ability of some emergency message, in some embodiments, the transmit power of the message can be boosted several dBs if the message includes some emergency signal. This can improve the decoding reliability of this emergency signal. For example, the emergency braking the vehicle, emergency accelerating the vehicle, and emergency changing a road lane of the vehicle can be regarded as the emergency signal.

Figure 9A:
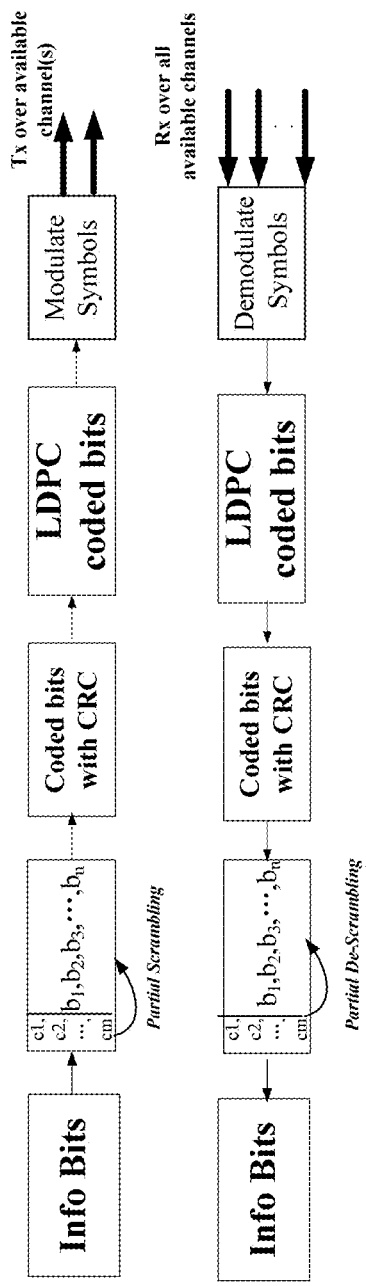
FIGS. 9A and 9B show partial scrambling techniques applied to the transmission side of the grant-free transmission.
Figure 9B:
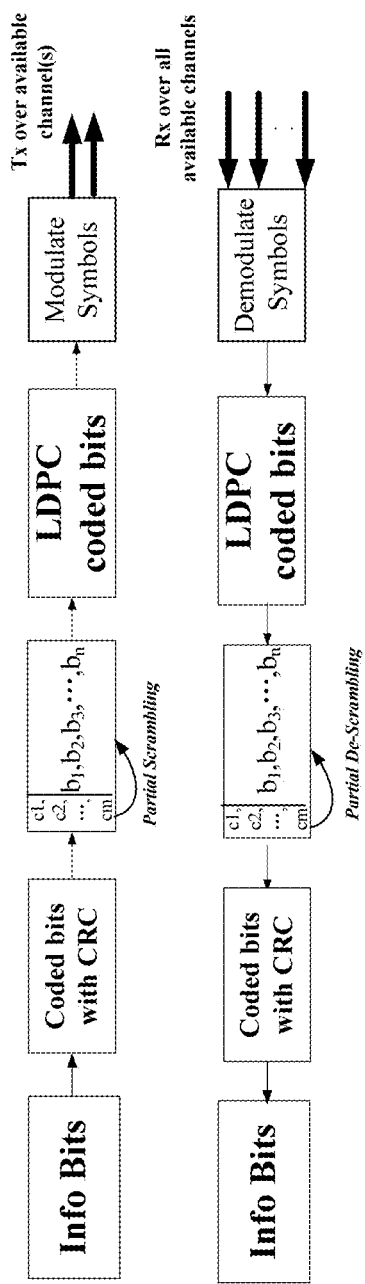

FIGS. 9A and 9B show partial scrambling techniques applied to the transmission side of the grant-free transmission. The scrambling operations are applied to the bits before and after the CRC coding operations respective. The scrambling sequence is determined from a certain part of bits in the message payload whose information (e.g. the bit index within the information bits) is known to the BS. The scrambling sequence generation methodology, if exist, is also known to the BS. The part of bits generating the scrambling sequence could be the plate information if the information is included in the payload message. When the payload is successfully decoded, the scrambling sequences could be re-generated based on the decoded bits and the sequence generation methodology. With the scrambling operations, the multi-user interference as well as the self-interference could be randomized. Considering the cases where the transmit bits are similar across difference vehicles, the channel estimation based on the scrambled bits will lead to increased channel estimation accuracy and thereby better interference cancellation and decoding performance for the remaining UEs. The conventional scrambling operations are based on the fact that the scrambler generation bits are identifiers known the both the Tx and Rx side prior to payload transmission. However, in grant-free transmission, the communications are more likely to happen with no central control unit and the identifiers are not known to both Tx and Rx sides. The partial scrambling technology suits better grant-free transmission.

Figure 10:
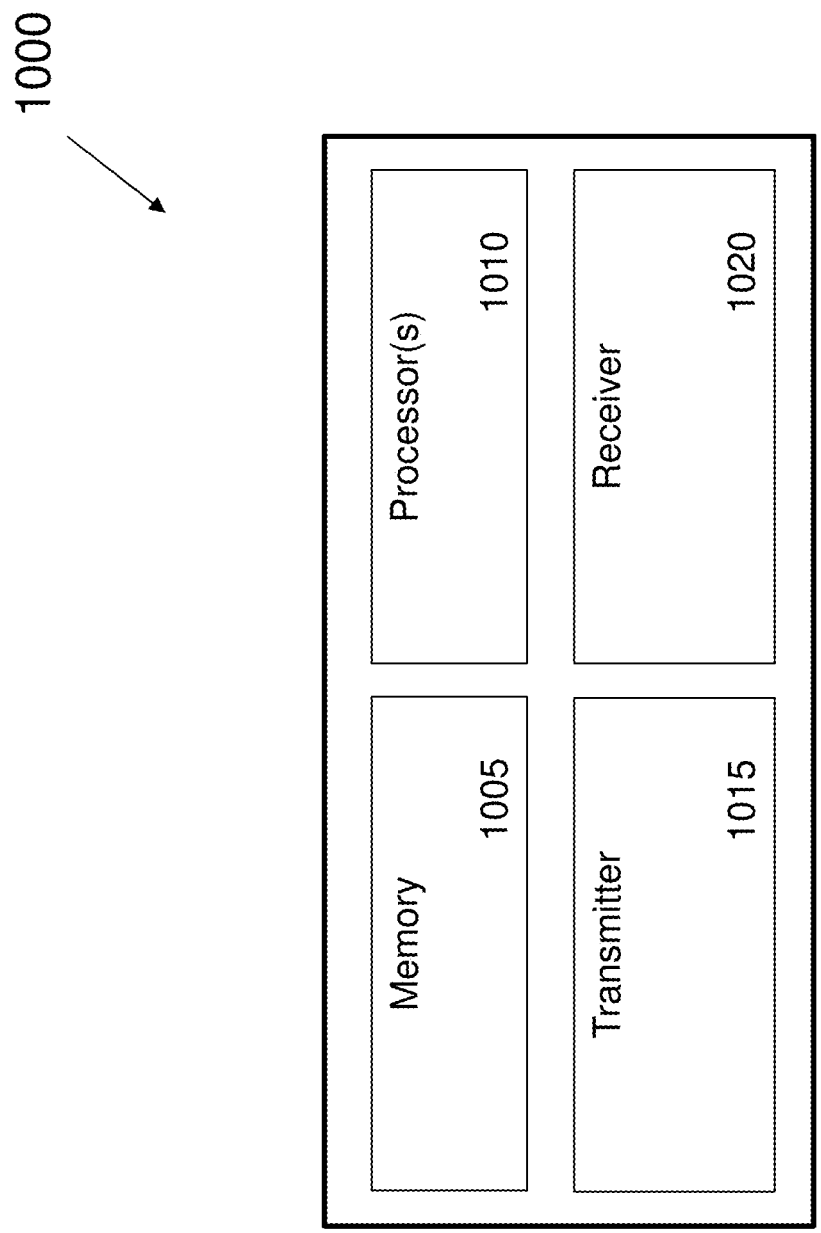
FIG. 10 shows an exemplary block diagram of a hardware platform that may be a part of a user equipment or device or vehicle.

FIG. 10 shows an exemplary block diagram of a hardware platform 1000 that may be a part of a user equipment or device or vehicle. The hardware platform 1000 includes at least one processor 1010 and a memory 1005 having instructions stored thereupon. The instructions upon execution by the processor 1010 configure the hardware platform 1000 to perform the operations described in FIGS. 1 to 9B and in the various embodiments described in this patent document. For example, the processor 1010 may generate a message using the techniques described in this patent document. The transmitter 1015 transmits or sends the message to one or more additional devices. The receiver 1020 receives information or message transmitted or sent by another device, and the processor 1010 may perform the multi-user detection process as described in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    generating, by a device, a message to be transmitted via a plurality of transmission channels, wherein the message includes information indicative of:
        a plurality of channel indexes associated with the plurality of transmission channels; and
    transmitting the message on each of the plurality of transmission channels associated with the device,
        wherein the plurality of transmission channels are selected by the device independently,
        wherein the message includes information about a plurality of pilot signals associated with the plurality of transmission channels,
        wherein the plurality of pilot signals are independently selected or generated by the device,
        wherein a pilot signal is randomly selected for each channel, and
        wherein the plurality of pilot signals for the plurality of transmission channels are uncorrelated or independent.

2. The method of claim 1, wherein the plurality of pilot signals is generated by a sequence generator according to information of the plurality of pilot signals, wherein a seed or an initial state of sequence generator associated the plurality of pilot signals are determined by information of the plurality of pilot signals.

3. The method of claim 1, further comprising:
    adding a first pilot signal and a second pilot signal to a first set of data and a second set of data, respectively, wherein the first pilot signal and the second pilot signal are generated or selected from the plurality of pilot signals; and
    transmitting the first set of data and the second set of data using a first transmission channel and a second transmission channel, respectively.

4. The method of claim 1,
    wherein information bits of the message indicate indexes of the plurality of pilot signals.

5. The method of claim 1,
    wherein information bits of the message indicate seed values of the plurality of pilot signals.

6. The method of claim 1,
    wherein the message includes information about a plurality of spreading sequences associated with the plurality of transmission channels,
    wherein the plurality of spreading sequences are independently selected or generated by the device,
    wherein a spreading sequence is independently selected for each channel, and
    wherein the plurality of spreading sequences for the plurality of transmission channels are uncorrelated or independent.

7. The method of claim 6, wherein the plurality of spreading sequences are generated by a sequence generator with seed values or initial states determined by information about the plurality of spreading sequences associated with the plurality of transmission channels.

8. The method of claim 6, further comprising:
spreading a first set of data and a second set of data using a first spreading sequence and a second spreading sequence, respectively, wherein the first spreading sequence and the second spreading sequence are generated or selected from the plurality of spreading sequences; and
transmitting the first and the second set of data using a first transmission channel and a second transmission channel, respectively.

9. The method of claim 6,
wherein information bits of the message indicate indexes of the plurality of spreading sequences from a spreading sequence set associated with the plurality of transmission channels.

10. The method of claim 6,
wherein information bits of the message indicate seed values or initial state values of the plurality of spreading sequences associated with the plurality of transmission channels.

11. The method of claim 1,
wherein the message includes information of a plurality of spreading sequences that are associated with the plurality of transmission channels, and
wherein an index of at least one pilot signal is mathematically related to an index of at least one spreading sequence.

12. The method of claim 1,
wherein the device is included in a vehicle, and
wherein the message further includes vehicle condition information, operational information about a driver of the vehicle, or information associated with one or more sensors of the vehicle.

13. An apparatus for wireless communication comprising a processor, configured to implement a method comprising:
generate a message to be transmitted via a plurality of transmission channels, wherein the message includes information indicative of:
a plurality of channel indexes associated with the plurality of transmission channels; and
transmit the message on each of the plurality of transmission channels associated with the apparatus,
wherein the plurality of transmission channels are selected by a device independently,
wherein the message includes information about a plurality of pilot signals associated with the plurality of transmission channels,
wherein the plurality of pilot signals are independently selected or generated by the device,
wherein a pilot signal is randomly selected for each channel, and
wherein the plurality of pilot signals for the plurality of transmission channels are uncorrelated or independent.

14. The apparatus of claim 13, wherein the plurality of pilot signals is generated by a sequence generator according to information of the plurality of pilot signals, wherein a seed or an initial state of sequence generator associated the plurality of pilot signals are determined by information of the plurality of pilot signals.

15. The apparatus of claim 13, wherein the processor is further configured to implement the method, comprising:
add a first pilot signal and a second pilot signal to a first set of data and a second set of data, respectively, wherein the first pilot signal and the second pilot signal are generated or selected from the plurality of pilot signals; and
transmit the first set of data and the second set of data using a first transmission channel and a second transmission channel, respectively.

16. The apparatus of claim 13,
wherein the message includes information about a plurality of spreading sequences associated with the plurality of transmission channels,
wherein the plurality of spreading sequences are independently selected or generated by the device,
wherein a spreading sequence is independently selected for each channel, and
wherein the plurality of spreading sequences for the plurality of transmission channels are uncorrelated or independent.

17. The apparatus of claim 16, wherein the plurality of spreading sequences are generated by a sequence generator with seed values or initial states determined by information about the plurality of spreading sequences associated with the plurality of transmission channels.

18. The apparatus of claim 16, wherein the processor is further configured to implement the method, comprising:
spread a first set of data and a second set of data using a first spreading sequence and a second spreading sequence, respectively, wherein the first spreading sequence and the second spreading sequence are generated or selected from the plurality of spreading sequences; and
transmit the first and the second set of data using a first transmission channel and a second transmission channel, respectively.

19. The apparatus of claim 13, wherein information bits of the message indicate indexes of the plurality of pilot signals.

20. The apparatus of claim 13, wherein information bits of the message indicate seed values of the plurality of pilot signals.

* * * * *